United States Patent [19]

Oranje

[11] Patent Number: 5,224,976
[45] Date of Patent: Jul. 6, 1993

[54] DEVICE FOR SEPARATING LIQUIDS AND/OR SOLIDS FROM A HIGH-PRESSURE GAS STREAM

[75] Inventor: Leendert Oranje, Haren, Netherlands

[73] Assignee: N.V. Nederlandse Gasunie, Groningen, Netherlands

[21] Appl. No.: 488,296

[22] Filed: Dec. 11, 1989

[30] Foreign Application Priority Data

Jun. 6, 1989 [NL] Netherlands ............. 8901429

[51] Int. Cl.⁵ ............................................. B01D 45/16
[52] U.S. Cl. ........................................ 55/399; 55/449; 55/457
[58] Field of Search ................ 55/449, 399, 457, 394, 55/392

[56] References Cited

U.S. PATENT DOCUMENTS

| | | | |
|---|---|---|---|
| 1,565,318 | 12/1925 | Fisher | 55/457 |
| 1,573,135 | 2/1926 | Bourne et al. | 55/457 X |
| 2,045,503 | 6/1936 | Wagner | 55/457 X |
| 2,692,655 | 10/1954 | Jeeps | 55/457 |
| 3,169,842 | 2/1965 | Streete et al. | 55/457 X |
| 3,386,588 | 6/1968 | Ades | 55/457 X |
| 3,590,558 | 7/1971 | Fernandes | 55/457 X |
| 3,822,533 | 7/1974 | Oranje | 55/394 |
| 3,988,132 | 10/1976 | Oranje | 55/399 |

FOREIGN PATENT DOCUMENTS 1504489 10/1967 France .

*Primary Examiner*—Richard L. Chiesa
*Attorney, Agent, or Firm*—Cushman, Darby & Cushman

[57] ABSTRACT

A device for separating liquids and/or solids from a high-pressure gas stream having a cylindrical vessel fitted with a top compartment into which the gas stream is fed, a middle compartment having a number of blades set helicoidally around the axis of the vessel, and a bottom compartment for separating the gas and the liquid and/or solids. A coaxial gas discharge pipe projects upwardly from the bottom compartment through the middle and top compartments, around which helicoidal blades have been fixed, each helicoidal blade being composed of a bottom section with a constant pitch and a section with a gradually increasing pitch. Vertical baffles are fitted between the helicoidal blades which, viewed in the flow direction of the gas, extend from the discharge pipe in the direction of the inner wall of the vessel. Conical sleeve sections are provided in the separation section of the device, at the outer wall of the gas discharge pipe.

12 Claims, 3 Drawing Sheets

DEVICE FOR SEPARATING LIQUIDS AND/OR SOLIDS FROM A HIGH-PRESSURE GAS STREAM

The invention relates to a device for separating liquids and/or solids from a high-pressure gas stream, comprising a cylindrical vessel with a virtually vertically set axis fitted with:

a top compartment to which the gas stream is fed;

a middle compartment comprising a number of blades shaped helicoidally around the axis;

a bottom compartment for the separation of the gas and the liquid and/or solids and a coaxial gas discharge pipe projecting upwards from the bottom compartment through the middle and top compartments, around which helicoidal blades have been fixed.

Such a device is known from the U.S. Pat. No. 3,988,132. In this device the gas is caused to rotate by the helicoidal blades. The separation of liquids and/or solids from the gas stream is the result of the centrifugal effects created in the gas stream, causing the heavier parts to move to the outside of the curved gas stream and accumulate against the inner wall of the vessel, after which they are discharged to a reservoir at the bottom of the vessel as a result of gravity.

It has been found that poor results are obtained with such a device when the pressure of the gas stream is considerably higher than atmospheric pressure, particularly when the pressure exceeds 8 bar. The effectiveness of the performance of such a device is substantially characterised by the following factors: the efficiency of the collection of liquids and/or solids as a function of the flow rate and the density of the gas; the pressure drop as a function of the flow rate and the density of the gas.

The gas density is a very important quantity with regard to the performance of a centrifugal gas separator. In general, the collection efficiency and also the pressure drop of a centrifugal separator attain the most favourable values when the flow through the separator is an ideally ordered centrifugal flow, on which no other flows such as turbulences and secondary flows are superimposed.

The superimposed flows mentioned above are undesirable because they cause a loss of energy and thus increase the pressure drop over the separator and contribute nothing to the scrubbing process, which they, on the contrary, hinder. These undesired flows are partly aimed at the centre of the vessel, as a result of which a portion of the substances to be separated off is transported, counter to the intentions, to this centre of the vessel, which has an adverse effect on the collection efficiency. In addition, turbulences in the gas stream may cause atomization of liquid into droplets that are so small that they are not separated from the gas stream.

The aim of the invention is to provide a device as mentioned in the preamble which is suitable for separating liquids and/or solids from a high-pressure gas stream, said device having been furnished with means that greatly reduce undesired lateral flows, as a result of which, at unchanged gas flow rate, mass density and vessel dimensions, the collection efficiency is substantially improved and the pressure drop is minimized with respect to similar separators without these means.

According to the invention this is achieved because each helicoidal blade is composed of a bottom part with a constant pitch and a part with a pitch which gradually increases in upward direction. This results in a gradual acceleration when the gas is caused to rotate, which leads to a smaller pressure drop of the gas.

According to the invention the constant pitch of the blades lies between 5° and 20° and increases gradually in upward direction to a maximum of 60°. Preferably, the constant pitch lies between 10° and 15° and increases in upward direction to a maximum of 45°.

In addition, vertical baffles have been provided between the helicoidal blades, which, viewed in the flow direction of the gas, extend from the outer wall of the gas discharge pipe towards the inner wall of the vessel. These baffles are shaped like flat planes, which are by preference not curved but straight. This is done from the point of view for easier manufacturing. The length of the straight, flat planes is 0.2 to 0.9 of the distance between the gas discharge pipe and the inner wall of the vessel.

Viewed in the flow direction of the gas stream, the baffles and the inner wall of the cylindrical vessel together constitute a gradually narrowing cross section for the gas stream. The flat baffles run parallel to the axis of the cylindrical vessel. These baffles improve the capacity for separating liquids and/or solids from the gas because a higher centrifugal gas velocity is obtained, without an increase in the pressure drop.

The free ends of the flat baffles are sharp according to the invention. The result of this is that the liquid adhering to the baffle and moving towards the free end is not forced round this end to the back of the baffle, as is observed with rounded free ends, but is thrown off the end. In the case of the rounded embodiment the liquid was found to be atomized into fine droplets that cannot be collected, which effect increases with the gas pressure. To further improve the separation of liquids from the gas at least one conical sleeve section has been installed in the separation section of the cylindrical vessel, on the outside of the gas discharge pipe. These sleeve sections serve as so-called anti-film skirts, that is, any liquid adhering to the outer wall of the gas discharge pipe is discharged along these conical sleeve sections in the direction of the wall of the cylindrical vessel and does not move towards the outlet of the separator. The angle between the sleeve sections and the centre line of the vessel lies between 15° and 45°. The distance between the free end of the sleeve sections and the inner wall of the vessel is between 0.25 and 0.70 and by preference between 0.3 and 0.6 of the distance between the outer wall of the gas discharge pipe and the inner wall of the cylindrical vessel.

The collection efficiency obtained for liquids and/or solids with the means according to the invention amounts to 99.5–100% and a decrease in pressure drop is obtained of approx. 22% with respect to a gas scrubber without these means.

The following table shows the results of tests carried out with a high-pressure gas scrubber furnished with the means according to the invention and with a similar high-pressure gas scrubber without the means according to the invention.

The tests were carried out with natural gas with a mass density of 32 kg/m$^3$ (34–36 bar).

| Gas flow rate (kg gas/h) | Collection efficiency without the means according to the invention | Collection efficiency with the means according to the invention |
|---|---|---|
| 2520 | 89% | >99.5% |

| Gas flow rate (kg gas/h) | Collection efficiency without the means according to the invention | Collection efficiency with the means according to the invention |
| --- | --- | --- |
| 4200 | 84% | >99.5% |
| 5880 | 83% | >99.5% |

BRIEF DESCRIPTION OF THE DRAWINGS

Other characteristics and advantages will become apparent from the following description, in which reference is made to the appended drawings. In these.

DETAILED DESCRIPTION OF THE PREFERRED EMBODIMENT

Figure 1:
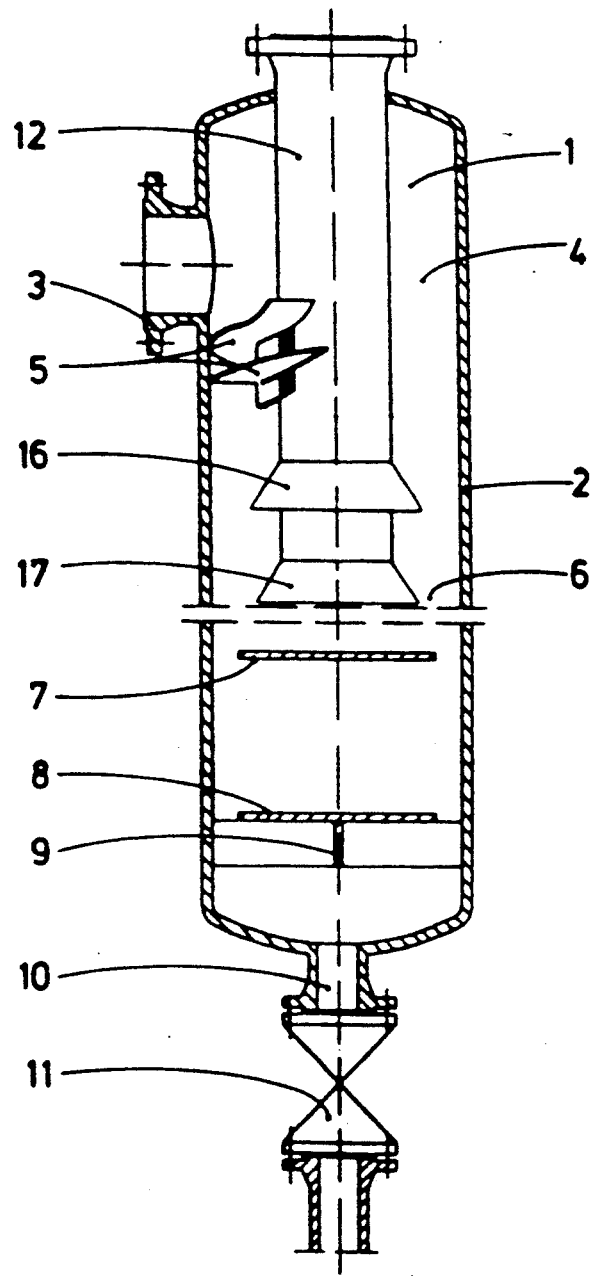
FIG. 1 is a cut-away vertical view of the inside of a separator according to the invention.
Figure 2:
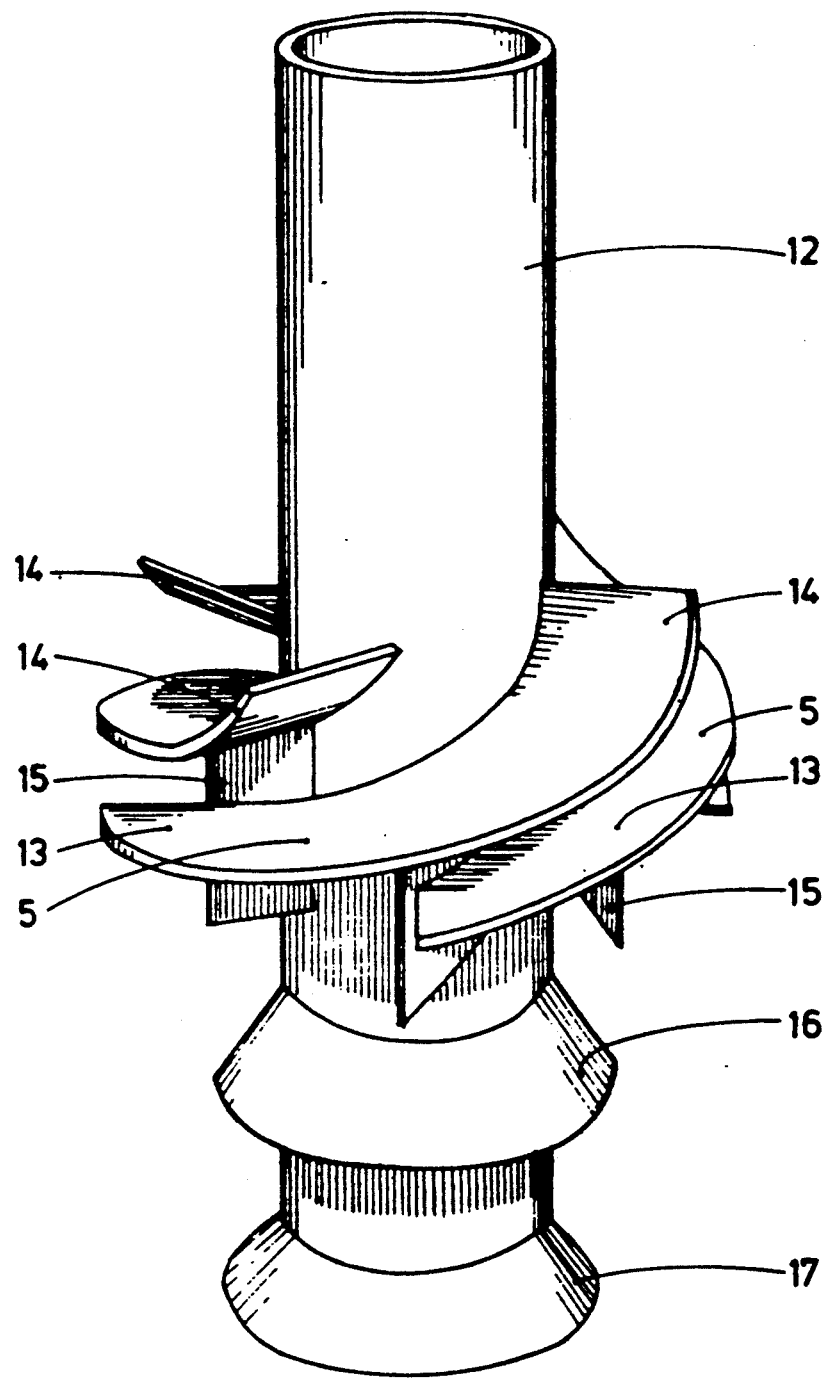
FIG. 2 is a perspective representation of the gas discharge pipe, showing blades, baffles and sleeve sections.

The gas to be scrubbed is fed into the top compartment 1 of the separator 2 via the pipe nozzle 3. The blades 5 present in the middle compartment 4 cause the gas to rotate in order to convert the flow energy of the gas into a centrifugal force, required for the separation. The liquid and/or solid matter separated off accumulates on the inner wall 6 of the vessel 2 and then moves downwards and is caused to settle by the plates 7, 8 and 9. The material separated off is discharged via pipe 10 and valve 11.

The scrubbed gas is discharged via gas discharge pipe 12, which is mounted coaxially with the vessel 2 and projects upwards from the bottom compartment 6 through the middle compartment 4 and the top compartment 1. The helicoidal blades 5 are fixed to the gas discharge pipe 12 at some distance from one another and partially overlap one another, thus creating the desired curved channel. Each helicoidal blade 5 is composed of a bottom section 13 with a constant pitch and a section 14 with a pitch that gradually increases in upward direction. This causes a gradual acceleration of the gas fed into the separator 2, which results in a smaller pressure drop when the gas is caused to rotate.

The constant pitch of the blades 5 lies between 5° and 20°, preferably between 10° and 15°, and increases to at most 60°, preferably at most 45°, near the gas inlet section.

Figure 3:
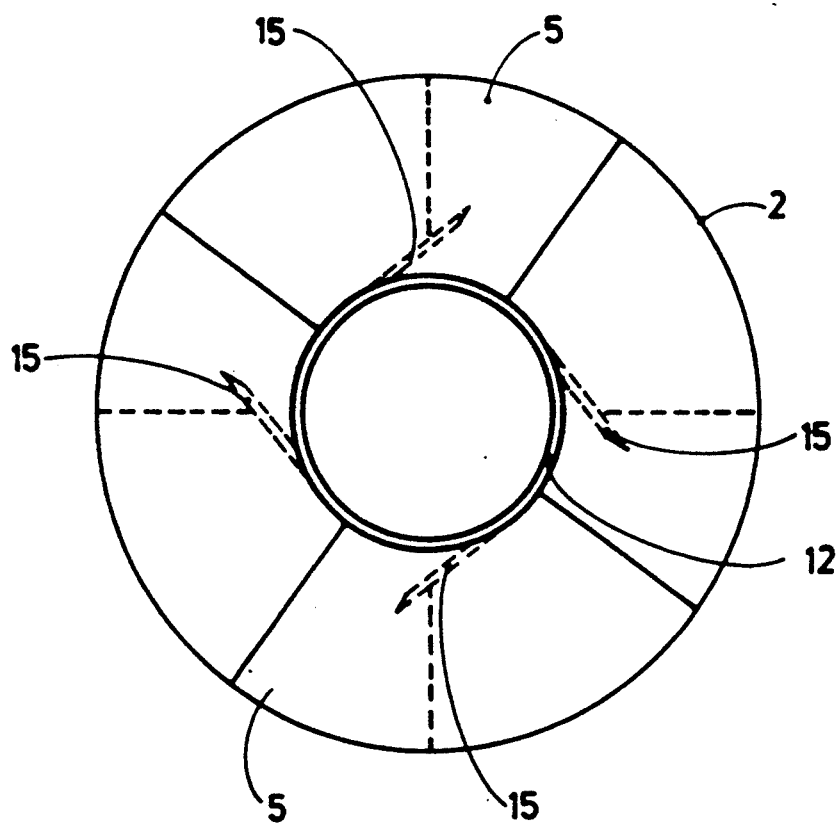
FIG. 3 is a top view of a cross section of the gas discharge pipe at the height of the baffles.

Between the blades 5 are vertical baffles 15, which, viewed in the flow direction of the gas, extend from the gas discharge tube 12 in the direction of the inner wall of the vessel 2. These baffles 15 are shaped like flat planes. These baffles improve the liquid separating capacity. This is improved even more when the free ends of the baffles are sharp, as is shown in FIG. 3.

To further improve the separation of the liquids from the gas conical sleeve sections 16 and 17 have been fixed to the outer wall of the gas discharge pipe 12 in the separation section 6 of the vessel 2. These sleeve sections serve as so-called anti-film skirts, that is, liquid adhering to the outer wall of the gas discharge pipe 12 is guided along these conical sleeve sections in the direction of the wall of the vessel 2. The angle between the sleeve sections 16 and 17 and the centre line of the vessel 2 lies between 15° and 45°. The distance between the free end of the sleeve sections 16 and 17 and the inner wall of the vessel 2 is between 0.25 and 0.70 and by preference between 0.3 and 0.6 of the distance between the outer wall of the gas discharge tube 12 and the inner wall of the vessel 2.

The device according to the invention can be used to purify gases under high pressure, that is, pressures of more than 8 bar up to even 100 bar or more. This has been demonstrated in recent tests with natural gas at pressures of 150 bar.

I claim:

1. Device for separating liquids and/or solids from a high-pressure gas stream, comprising a cylindrical vessel with a virtually vertically set axis fitted with:
    a top compartment to which the gas stream is fed;
    a middle compartment comprising a number of blades shaped helicoidally around the axis;
    a bottom compartment for the separation of the gas and the liquid and/or solids and a coaxial gas discharge pipe projecting upwards from the bottom compartment through the middle and top compartments, around which helicoidal blades have been fixed, wherein each helicoidal blade consists of a bottom part with a constant pitch and a part with a pitch that gradually increases in upward direction.

2. Device according to claim 1, wherein the constant pitch of the blades is between 5° and 20° and gradually increases in upward direction to at most 60°.

3. Device according to claim 1, wherein the constant pitch of the blades is between 10° and 15° and increases in upward direction to at most 45°.

4. Device according to claim 1, wherein vertical baffles are provided between the helicoidal blades, which baffles, viewed in the flow direction of the gas, extend from the discharge pipe in the direction of the inner wall of the vessel.

5. Device according to claim 4, wherein the baffles are manufactured as flat, straight planes.

6. Device according to claim 5, wherein the length of the straight, flat baffles is 0.2 to 0.9 of the distance between the gas discharge pipe and the inner wall of the vessel.

7. Device according to claim 5, wherein the baffles are shaped like flat planes.

8. Device according to claim 5, wherein the free ends of the baffles are sharp.

9. Device according to claim 1, wherein at least one conical sleeve section is provided at the outer wall of the gas discharge pipe, in said bottom compartment 10. Device according to claim 9, wherein the angle between the sleeve sections and the centre line of the vessel is between 15° and 45°.

11. Device according to claim 9, wherein the distance between the free end of the sleeve sections and the inner wall of the vessel is between 0.25 and 0.70 of the distance between the outer wall of the gas discharge pipe and the inner wall of the cylindrical vessel.

12. Device according to claim 9, wherein the distance between the free end of this sleeve sections and the inner wall of the vessel is between 0.3 and 0.6 of the distance between the outer wall of the gas discharge pipe and the inner wall of the vessel.

* * * * *